Patented June 12, 1923.

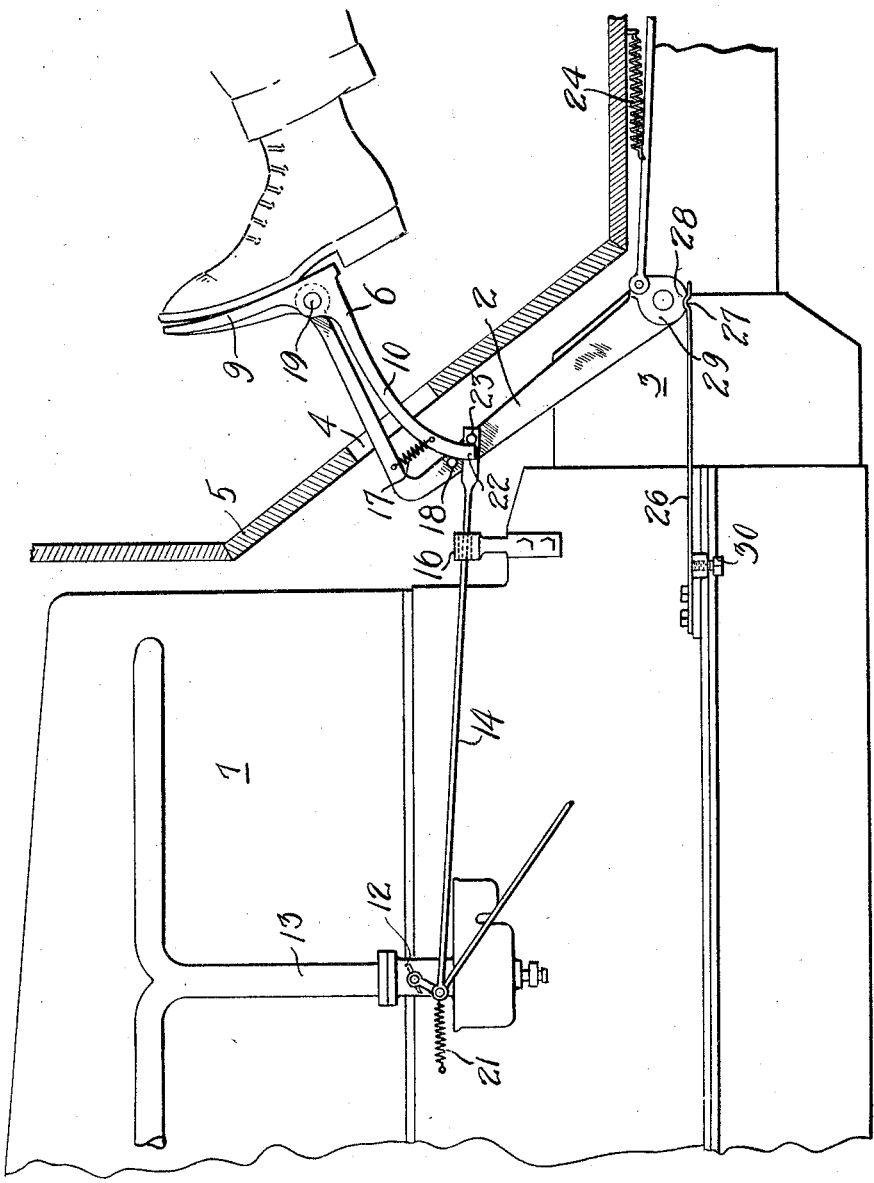

1,458,258

UNITED STATES PATENT OFFICE.

WILLIAM W. WHITTON, OF OAKLAND, CALIFORNIA.

CONTROL MECHANISM FOR AUTOMOBILES.

Application filed July 6, 1920. Serial No. 394,019.

*To all whom it may concern:*

Be it known that I, WILLIAM W. WHITTON, a citizen of the United States, and a resident of Oakland, county of Alameda, and State of California, have invented a new and useful Control Mechanism for Automobiles, of which the following is a specification.

My invention relates to control mechanisms of automobiles or the like and particularly to such control mechanisms as are adapted to be operated by the foot of the driver.

An object of the invention is to arrange the foot brake lever and the foot throttle commonly termed the "fuel accelerator" in such relation and position that either may be operated by the foot which operates the other without necessitating the disengagement of the foot from the other.

Another object of the invention is to combine the foot brake lever and "fuel accelerator" so as to practically form a single substantially unitary member, permitting however, the independent manipulation and full control of the mechanism involved.

The invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claim.

The drawing is a view taken through the dash of an automobile which has been equipped in accordance with my invention.

In modern types of automobiles, the control mechanism is so arranged that the driver usually operates the foot brake lever and the "fuel accelerator" one at a time with but one foot, the other foot being reserved for manipulating the clutch. This condition necessitates the continual changing of the first mentioned foot from engagement with the accelerator to engagement with the brake lever, and vice versa, thereby not only rendering driving in congested thoroughfares more or less fatiguing, but at all times dangerous, the latter being due to the fact that the driver's gaze is almost invariably directed well ahead of him yet frequently he has to change his foot from the accelerator to the brake pedal without the loss of a second's time and without shifting his gaze from ahead. Ofttimes the driver, especially an inexperienced one, when making the change under the above conditions, will miss the brake pedal at first and thereby precipitate a more or less dangerous situation. In accordance with my invention the foregoing disadvantages are completely eliminated since the foot brake pedal and the accelerator are so combined that one foot of the driver may be continually in engagement with the brake pedal and accelerator at the same time.

Briefly expressed my invention as here embodied comprises a pivotally mounted foot lever for controlling the brakes of the automobile, and a second foot lever for controlling the fuel pivoted to the brake lever in such a manner that both of the levers may be engaged at one time by one foot of the operator. Means are provided for resiliently retaining the foot brake lever and the fuel control lever normally in the position wherein the brakes are released and the admission of fuel retarded respectively, and the connections between the levers and the fuel throttle valve are such that when one of the levers is used the other will either tend to remain in one of said positions or be forced to assume it.

A detailed description of the present form of the control mechanism follows:

In carrying out my invention I preferably use a foot brake lever 2 pivoted to some relatively stationary member 3 and resembling and operating in a manner somewhat similar to the usual form of foot brake lever now in general use on automobiles. Pivoted to the outer end of that portion of the brake lever 2 which extends outward through the slot 4 formed in the dash 5, is a second lever 6 by which the admission of fuel to the automobile engine 7 may be governed in a manner similar to that afforded by the usual "gas accelerator." One arm of the fuel control lever is preferably partly in the form of a pedal 9 which is adapted to be engaged by the driver's foot when he desires to operate either of the levers. The other arm 10 of the fuel control lever preferably extends into the slot 4 of the dash and is connected to the valve 12 of the fuel intake pipe 13 by a rod 14 suitably guided as in a bearing 16. The fuel control lever is normally held in the position for retaining the valve 12 in its closed position, by means of a spring 17 which presses the arm 10 against a projection 18 formed on brake lever, thus referring to the drawing it will be apparent that when pressure is exerted against the pedal 9 at a point below the pivot 19, the brake lever will be rocked, but when pressure is brought to bear above the pivot, the fuel control lever 6 will be rocked and thus cause the valve 12 to open against the action of the spring 21. To avoid opening of the valve 12 when the brake lever is depressed, means are provided for causing the arm 10 to become disconnected from the rod 14, when the brake lever is depressed, so that the valve may yield to the influence of spring 21 and assume a closed position. In accordance with the foregoing the free end 22 of the fuel control lever arm 10 is arranged to merely engage a stop 23 on the rod 14 so that the lever 6 is capable of moving the rod 14 in one direction only. Accordingly just as soon as the brake lever is depressed the fuel control lever 6 will be moved to an inoperative position and the valve 12 caused to remain closed. It will be noted that the arm 10 is so curved as to allow of a smooth gradual re-engagement of the fuel lever as the brake lever approaches its inoperative position, and vice versa.

The combined pressure of the springs 17 and 21 which resists the rocking of the fuel control lever is very much less than that of the spring 24 which resists the forward movement of the brake lever. In this manner the fuel control lever may be ordinarily operated without danger of the brake lever being moved, but in order to augment the foregoing, adjustable means are provided for affecting a comparatively large resistance to the initial movement of the brake lever. This means preferably comprises a flat spring 26 one end of which is secured to a stationary portion of the automobile and the other end provided with a lip 27 which is adapted to seat in a recess 28 in the hub 29 of the brake lever, when the latter is in its normal position. Thus the brake lever cannot be depressed before the lip 27 is ejected from the recess. The tension with which the lip is retained in engagement with the recess may be readily varied by means of the adjusting screw 30.

In the operation of my control mechanism the driver's foot is adapted to rest upon the pedal in the manner indicated in the drawings. If he desires only to control the flow of the fuel he merely manipulates the pedal, and if he finds it necessary to put on the brakes he then depresses the entire structure, both of the foregoing operations being readily effected of course without the necessity of removing the foot from either of the levers.

I claim:

In an automobile having an engine provided with a valve-controlled fuel intake passage, a foot-brake lever pivoted to a relatively stationary member and projecting thru an opening in the dash-board of the automobile, a fuel-control foot-lever pivoted to said brake-lever having one arm thereof extending thru said dash opening, and means concealed behind the dash-board for resiliently retaining said levers in inoperative position.

In testimony whereof, I have hereunto set my hand at Oakland, California, this 15th day of June, 1920.

WILLIAM W. WHITTON.

In presence of—
. FLOY CRANE.